United States Patent
Kim et al.

(10) Patent No.: US 8,326,334 B2
(45) Date of Patent: Dec. 4, 2012

(54) APPARATUS AND METHOD FOR MANAGING SPAM NUMBER IN MOBILE COMMUNICATION TERMINAL

(75) Inventors: Hyun-Soo Kim, Suwon-si (KR); Young-Chul Lee, Suwon-si (KR); Yu-Jin Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 229 days.

(21) Appl. No.: 12/622,964

(22) Filed: Nov. 20, 2009

(65) Prior Publication Data
US 2010/0124916 A1 May 20, 2010

(30) Foreign Application Priority Data
Nov. 20, 2008 (KR) .................. 10-2008-0115612

(51) Int. Cl.
*H04W 4/00* (2009.01)
(52) U.S. Cl. ............... 455/466; 455/412.1; 709/206; 379/210.02
(58) Field of Classification Search ............... 455/412.1, 455/412.2, 413, 414.1, 414.2, 415, 466, 517, 455/518, 550.1, 556.1, 556.2, 558, 566, 567; 709/204, 206, 223
See application file for complete search history.

(56) References Cited

U.S. PATENT DOCUMENTS

| | | | |
|---|---|---|---|
| 6,330,590 B1* | 12/2001 | Cotten ............... | 709/206 |
| 2006/0123083 A1* | 6/2006 | Goutte et al. ....... | 709/206 |
| 2006/0256012 A1* | 11/2006 | Fok et al. ........... | 342/457 |
| 2007/0232342 A1* | 10/2007 | Larocca ............. | 455/518 |
| 2008/0009299 A1* | 1/2008 | Ryu .................. | 455/466 |
| 2008/0133682 A1* | 6/2008 | Chadwick et al. .. | 709/206 |
| 2008/0305814 A1* | 12/2008 | Deng et al. ........ | 455/466 |
| 2009/0089279 A1* | 4/2009 | Jeong et al. ........ | 707/5 |
| 2009/0163178 A1* | 6/2009 | Kim ................. | 455/412.1 |
| 2009/0216868 A1* | 8/2009 | Gao et al. .......... | 709/223 |
| 2010/0205668 A1* | 8/2010 | Jeon ................. | 726/22 |

FOREIGN PATENT DOCUMENTS

KR  1020060082466  7/2006

* cited by examiner

*Primary Examiner* — Anthony Addy
(74) *Attorney, Agent, or Firm* — The Farrell Law Firm, P.C.

(57) ABSTRACT

An apparatus and a method for managing a spam number in a mobile communication terminal are provided. The method includes determining a spam index for each of at least one phone number using a reception record by phone number, and determining spam number registration or non-registration for each phone number depending on the spam index.

20 Claims, 5 Drawing Sheets

APPARATUS AND METHOD FOR MANAGING SPAM NUMBER IN MOBILE COMMUNICATION TERMINAL

PRIORITY

This application claims priority under 35 U.S.C. §119(a) to a Korean Patent Application filed in the Korean Intellectual Property Office on Nov. 20, 2009 and assigned Serial No. 10-2008-0115612, the contents of which are incorporated herein by reference.

BACKGROUND OF THE INVENTION

1. Field of the Invention

The present invention relates generally to an apparatus and a method for managing a spam number in a mobile communication terminal. More specifically, the present invention relates to an apparatus and a method for determining a spam index according to phone number and filtering messages or calls from a phone number designated as a sender of advertisements.

2. Description of the Related Art

In recent years, due to the increased usage of mobile communication terminals, there is an increasing trend of service providers using the mobile communication terminals as a means for advertising. For example, service providers may send messages or calls to mobile communication terminals to perform advertising. However, because these one-sided advertising messages or calls are sent to the mobile communication terminals irrespective of users' intentions to receive the advertisements, many users suffer an inconvenience of having to delete or filter undesired advertising messages or calls individually. The terms "spam message" or "spam phone call" denote advertising messages or calls undesired by the user.

Figure 1:
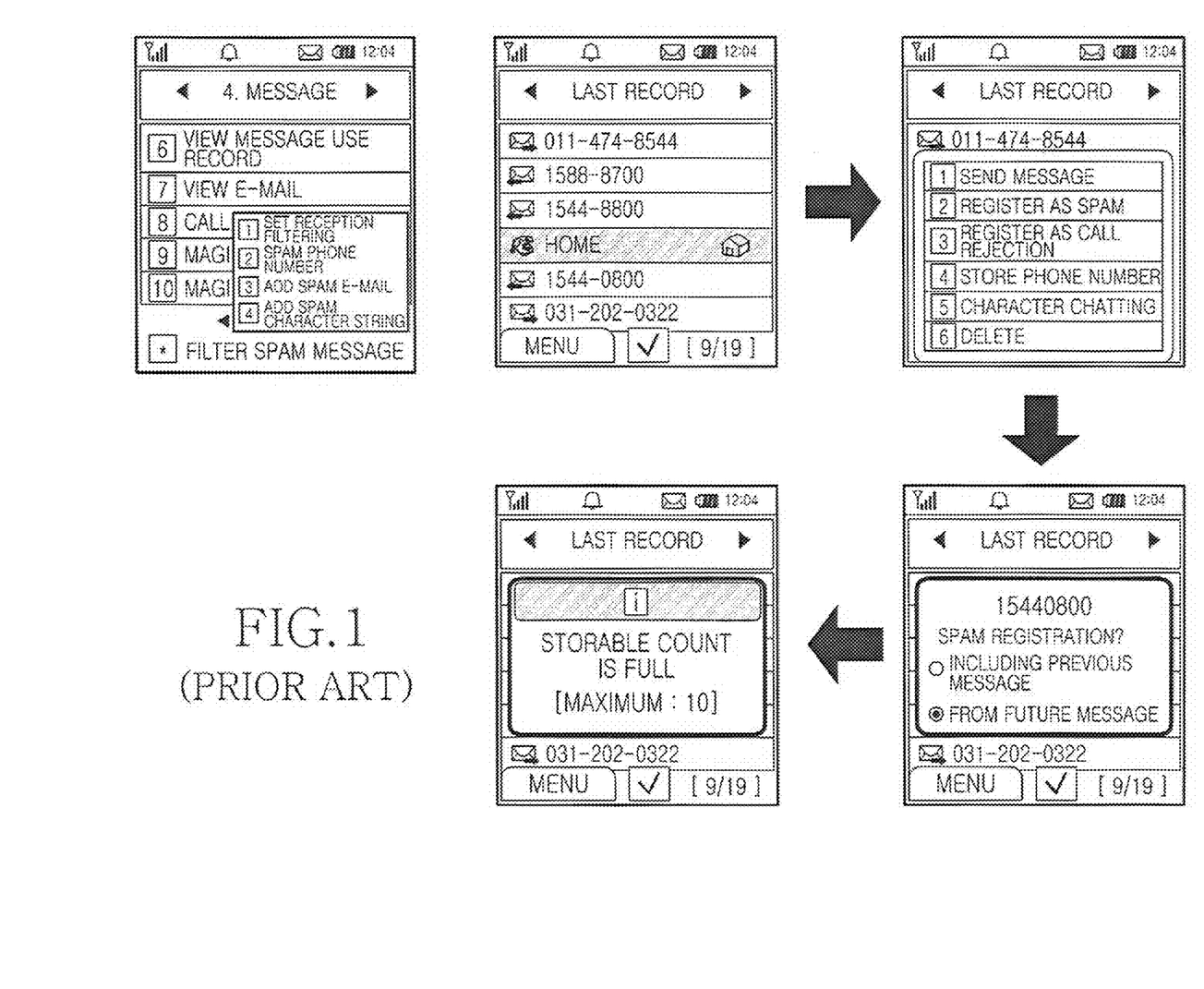
FIG. 1 is a diagram illustrating a screen configuration of registering a spam number in a mobile communication terminal according to the prior art.

Conventional mobile communication terminals or mobile communication service providers provide functions that enable users to filter the spam messages or spam phone calls. FIG. 1 is a diagram illustrating a conventional screen configuration for registering a spam number in a mobile communication terminal. For example, as illustrated in FIG. 1, the mobile communication terminal provides a function of registering a specific phone number as a spam number and filtering messages or calls from the spam number. Also, the mobile communication service provider provides a supplementary service of filtering messages or calls from a phone number requested by a user.

However, because conventional mobile communication terminals limit the number of phone numbers registrable as spam numbers, if the number of previously registered spam numbers is equal to the maximum value, a user suffers an inconvenience of having to delete the previously registered spam number in order to register an additional spam number or give up registering the additional spam number. Also, there is a problem that, despite a fact that spam messages or calls are no longer received from phone numbers registered as spam numbers, the user is not notified that the messages or calls are not received.

Also, there a user must directly contact a mobile communication service provider and perform an authentication procedure to use a supplementary service of filtering messages or calls from the mobile communication service provider. In this conventional system, an ill-intentioned third party may make ill use of the supplementary service by fraudulently using user information and requesting, changing or canceling the supplementary service.

SUMMARY OF THE INVENTION

The present invention has been made to address at least the above problems and/or disadvantages and to provide at least the advantages below. Accordingly, an aspect of the present invention is to provide an apparatus and a method for managing a spam phone in a mobile communication terminal.

Another aspect of the present invention provides an apparatus and a method for determining a spam index according to phone number and filtering a message or call of an advertising phone number in a mobile communication terminal.

A further aspect of the present invention provides an apparatus and a method for determining a spam index for a phone number registered as a spam number and canceling spam number registration in a mobile communication terminal.

A yet another aspect of the present invention provides a method and apparatus for determining a spam index for a phone number not stored in a phonebook and registering the phone number as a spam number in a mobile communication terminal.

The above aspects are achieved by providing a method and apparatus for managing a spam number in a mobile communication terminal.

According to one aspect of the present invention, a method for managing a spam number in a mobile communication terminal is provided. The method includes determining a spam index for each of at least one phone number using a reception record according to each phone number, and determining spam number registration or non-registration of each phone number according to the spam index.

According to another aspect of the present invention, an apparatus for managing a spam number in a mobile communication terminal is provided. The apparatus includes a controller and a storage unit. The controller determines a spam index for each of at least one phone number using a reception record according to each phone number, and determines spam number registration or non-registration for each phone number depending on the spam index. The storage unit stores a registration of a corresponding phone number as a spam number or deletes the registration of the corresponding phone number as a spam number according to a determination of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted for the sake of clarity and conciseness.

The following description is made for an apparatus and a method for determining a spam index by phone number and filtering a message or call of an advertising phone number in a mobile communication terminal. In the following description, a spam message using the advertising phone number as an outgoing phone number is described as an example. The present invention is also identically applicable to a spam phone call in the same manner as a spam message.

Figure 2:
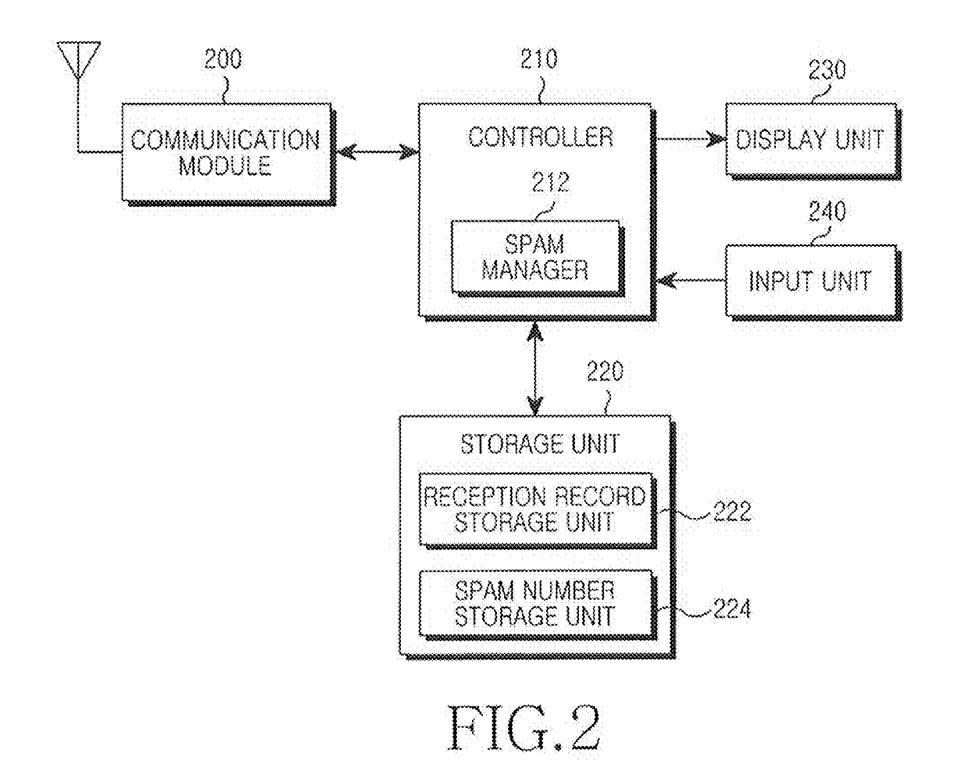
FIG. 2 is a block diagram illustrating a construction of a mobile communication terminal according to the present invention.

FIG. 2 illustrates a construction of a mobile communication terminal according to the present invention.

Referring to FIG. 2, a terminal (i.e., a Mobile Station (MS)) includes a communication module 200, a controller 210, a storage unit 220, a display unit 230, and an input unit 240. According to the present invention, the controller 210 includes a spam manager 212, and the storage unit 220 includes a reception record storage unit 222 and a spam number storage unit 224.

The communication module 200 frequency-down-converts a high frequency signal received through an antenna, decodes the down-converted signal, and provides the decoded signal to the controller 210. The communication module 200 encodes a baseband signal provided from the controller 210, frequency up-converts the encoded signal, and transmits the up-converted signal through the antenna.

The controller 210 performs processes and control for a general operation of the mobile communication terminal, including operations for voice telephony and data communication. In addition to general functions, the controller 210 according to an embodiment of the present invention includes the spam manager 212, thereby performing a function of determining a spam index by phone number and registering or unregistering spam numbers.

Figure 3:
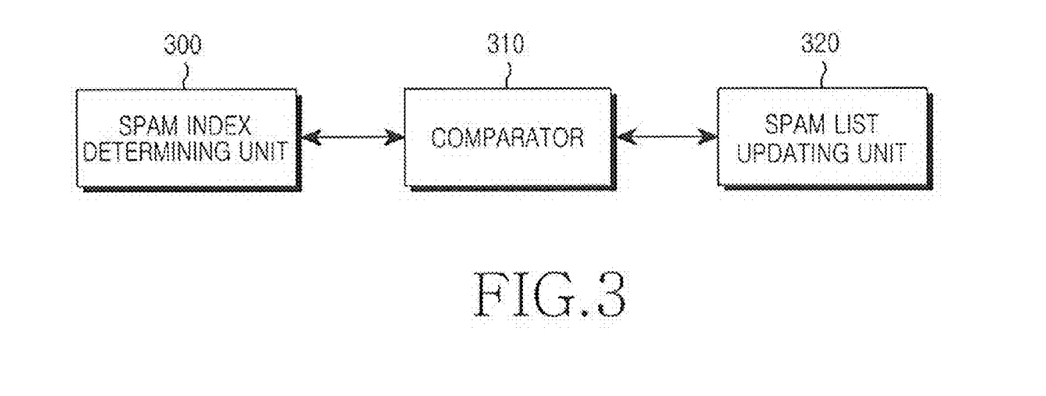
FIG. 3 is a block diagram illustrating a detailed construction of a spam manager in a mobile communication terminal according to the present invention.

FIG. 3 is a block diagram illustrating a detailed construction of a spam manager in a mobile communication terminal according to the present invention. As illustrated in FIG. 3, the spam manager 212 includes a spam index determining unit 300, a comparator 310, and a spam list updating unit 320, thereby performing a function of determining a spam index by phone number and, according to the determined spam index, registering a corresponding phone number or canceling spam number registration.

The spam index determining unit 300 determines a spam index using a reception record for each of at least one phone number. The spam index determining unit 300 identifies record information (e.g., a reception date, a reception time, and the number of times of reception) of a received message according to each phone number stored in the reception record storage unit 222 of the storage unit 220, assigns a weight according to the reception date or time of a call or message, and determines a spam index of each phone number. For example, as shown in Table 1 below, the spam index determining unit 300 can assign a weight by date, determine a spam index, add up all spam indexes by date, and then determine a spam index of a corresponding phone number.

TABLE 1

| Reception date | Number of times of generation | Weight | Spam index by date |
|---|---|---|---|
| 8/18 | 1 | 7 | 7 |
| 8/17 | 2 | 6 | 12 |
| 8/16 | 1 | 5 | 5 |
| 8/15 | 1 | 4 | 4 |
| 8/14 | 2 | 3 | 6 |
| 8/13 | 1 | 2 | 2 |
| 8/12 | 1 | 1 | 1 |

In Table 1, the reception date denotes a date at which a message is received, and the number of times of generation denotes the number of times of receiving a message by a corresponding phone number at the reception date. The spam index by date is obtained by multiplying the number of times of generation by a weight. As shown in Table 1, more recent dates have higher weight values than less recent dates. A spam index of a specific phone number is set higher if there are many messages recently received from the specific phone number, and set a spam index of a specific phone number is set lower if there were many messages received from the specific phone number in the past, but no messages have been received from the specific phone number recently. Therefore, if the mobile terminal recently received many messages from a phone number 'A', it is determined that a probability to receive a message from the phone number 'A' even in the future is high. Further if there the mobile terminal received many messages from a phone number 'B' in the past, but the mobile terminal has not recently received messages from phone number 'B', it is determined that there is a high probability of not receiving further messages from the phone number 'B' in the future.

The comparator 310 compares a spam index determined on a per-phone-number basis in the spam index determining unit 300 with a preset threshold value and provides the comparison result to the spurn list updating unit 320. If the spurn index determining unit 300 provides a spam index for a phone number that is not registered as a spam number, and the phone number is not registered in a phonebook of the mobile terminal, the comparator 310 compares this spurn index with a first threshold value and provides the comparison result to the spam list updating unit 320. If the spam index determining unit 300 provides a spam index for a phone number registered as a spam number, the comparator 310 compares this spam index with a second threshold value and provides the comparison result to the spam list updating unit 320.

The spam list updating unit 320 receives a result of comparison between the determined spam index and the first threshold value or second threshold value from the comparator 310 and determines whether to register a corresponding phone number as a spam number or whether to unregister a registered spam number. If the comparison result is that the determined spam index is greater than or is equal to the first threshold value, the spurn list updating unit 320 registers the phone number as a spurn number. If the comparison result is that the determined spurn index is less than the second threshold value, the spam list updating unit 320 unregisters the phone number from a spam number list. In other cases, the spam list updating unit 320 performs a control and process of a function of recording the spam index in the storage unit 220. At this time, if the spam index is greater than or is equal to the first threshold value or if the spam index is less than the second threshold value, the spurn list updating unit 320 can automatically register a corresponding phone number as a spam number or unregister a phone number from a spam number. Also, the spam list updating unit 320 can also display a message for requesting a user to determine whether to register a phone number as a spam number or whether to unregister a phone number from a spam number through the display unit 230.

The storage unit 220 stores a program for a general operation of the mobile communication terminal and a variety or kinds of data. Particularly, according to the present invention, the storage unit 220 includes the reception record storage unit 222 and the spam number storage unit 224 for the spam number management.

The reception record storage unit 222 stores record information (e.g., a reception time, and the number of times of reception) of a message received during a preset period on a per-phone-number basis. At this time, under control of the spam manager 212, the reception record storage unit 222 stores record information on a received message for a phone number registered as a spam number or a phone number not registered in a phonebook. When the phone number is registered as a spam number, the received message record information can be record information on a message received from a time point when the phone number is registered as a spam number to a present time point. When the phone number not registered as a spam number, the received message record information can be record information of a message received from a period preset on the basis of a previous time point to the present time point (e.g., a message received during the past one week on the basis of the present time point). The preset time period can also be set or changed by a user.

The spam number storage unit 224 stores phone numbers registered as spurn numbers and, according to a request of the spam manager 212, adds or deletes phone numbers registered as vain numbers. Also, under control of the spam manager 212, the spam number storage unit 224 stores a spam index for each phone number registered as a spam number.

The display unit 230 displays state information generated during an operation of the mobile communication terminal, numerals and characters, and a large amount of moving pictures and still pictures. etc. Particularly, under control of the spam manager 212, the display unit 230 displays a message for requesting user input for determining whether to register a specific phone number as a spam number or whether to unregister a phone number registered as a spam number. The display unit 230 further displays spam indexes of phone numbers registered as spam numbers.

The input unit 240 includes a plurality of numeral keys, character keys, and function keys, and provides key input data corresponding to a key pressed by a user to the controller 210. Further, according to an embodiment of the present invention, the input unit 240 receives input for determining whether to register a specific phone number as a spam number or whether to unregister a phone number registered as a spam number, and the input unit 240 provides the received input to the controller 210.

Figure 4:
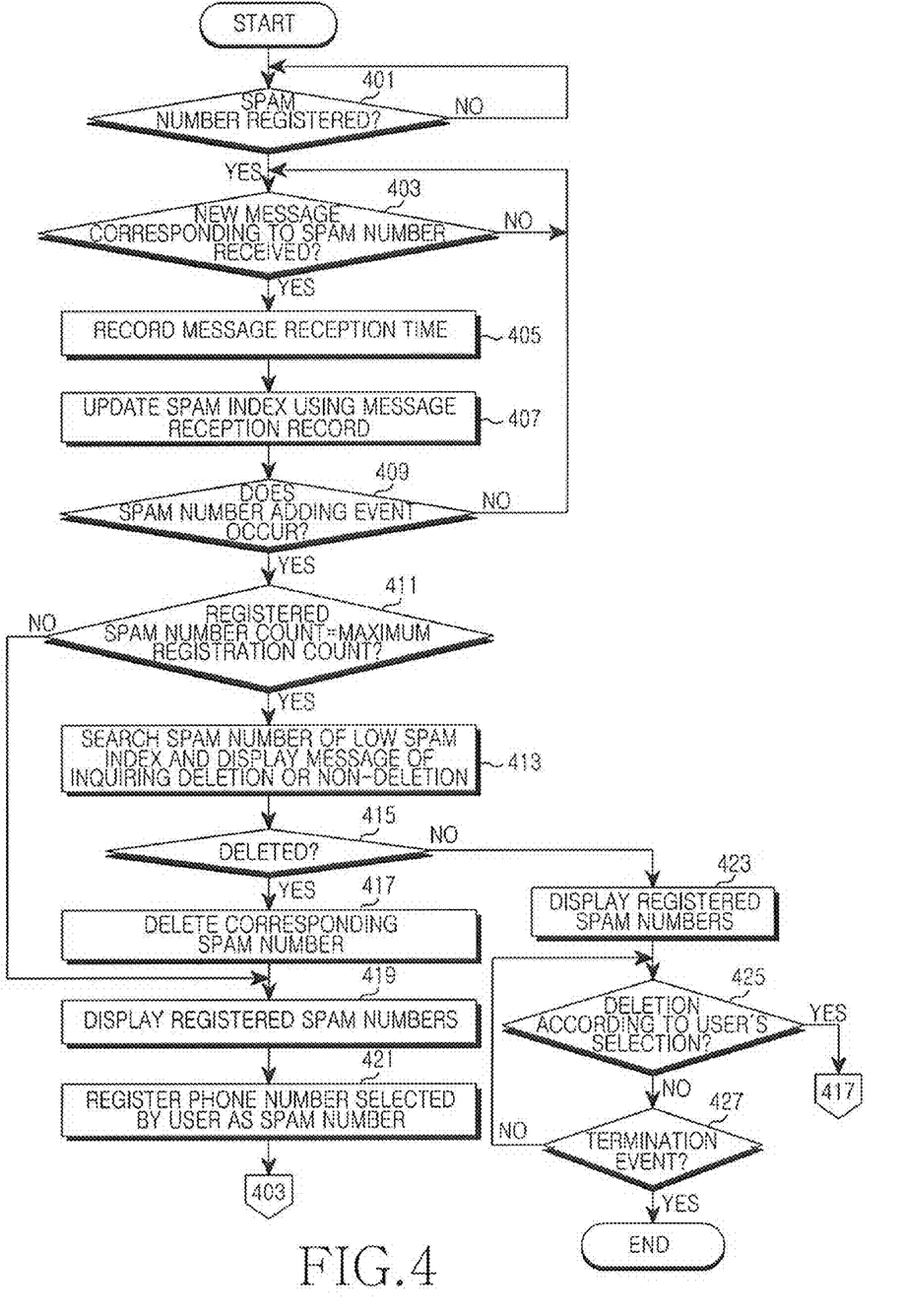
FIG. 4 is a flow diagram illustrating a procedure for efficiently using a limited space considering a spam index in a mobile communication terminal according to an embodiment of the present invention.

FIG. 4 illustrates a procedure for efficiently using a limited space considering a spam index in a mobile communication terminal according to an embodiment of the present invention.

Referring to FIG. 4, in step 401, the terminal determines whether a specific phone number is registered as a spam number. If the specific phone number is registered as a spam number, the terminal proceeds to step 403 and determines whether a message corresponding to the spam number is received.

When a message corresponding to a spam number is received, the terminal proceeds to step 405 and records information on the received message and then, in step 407, determines a spam index using the record. For example, the terminal records a date at which the message is received, a time when the message is received, and the number of times messages are received from the spam number on the same date and, by using the records, the terminal determines a spam index as shown in Table 1 above. At this time, the terminal stores the spam index in the spam number storage unit 224 for storing the phone numbers registered as the spam numbers.

Then, in step 409, the terminal determines whether a spam number adding event occurs. When a spam number adding event does not occur, the terminal returns to step 403 and again performs the subsequent steps. When the spam number adding event occurs, the terminal proceeds to step 411 and determines whether a previously registered spam number count is equal to the maximum registration count.

If the registered spam number count is equal to the maximum registration count, the terminal determines maintain the current number of registered spam numbers and, in step 413, searches for a spam number of a low spam index and displays a message for inquiring a user as to whether to delete the corresponding spam number. Then, in step 415, the terminal determines whether a corresponding spam number deletion is selected by a user. When the spam number deletion is selected, in step 417, the terminal cancels a spam registration of a corresponding phone number, deletes the corresponding phone number from the spam number storage unit 224 storing the phone numbers registered as the spam numbers, and proceeds to step 419. As an alternative, the terminal can also automatically delete the spam number of the low spam index without displaying a message of inquiring the user whether to delete the spam number.

However, if the registered spam number count is not equal to the maximum registration count, the terminal determines that the terminal can add a spam number and, in step 419, the terminal identifies spam numbers stored in the spam number storage unit 224 and their corresponding spam indexes and displays the registered spam numbers and the corresponding spam indexes. Then, in step 421, the terminal registers a phone number selected by the user as a spam number, and returns to step 403 and again performs the subsequent steps.

However, when spam number deletion is not selected by the user in step 415, the terminal proceeds to step 423 and displays registered spam numbers and their corresponding spam indexes. Then, in step 425, the terminal determines whether the user selects deletion of any one of the spam numbers. When the deletion of any of the spam numbers is selected, in step 417, the terminal deletes any spam numbers selected by the user among the spam numbers and then again performs the subsequent steps. When the deletion is not selected by the user, the terminal proceeds to step 427 and determines whether a termination event takes place. When a termination event does not take place, the terminal returns to step 425 and again performs the subsequent steps. When a termination event occurs, the terminal terminates the procedure according to an embodiment of the present invention.

Figure 5:
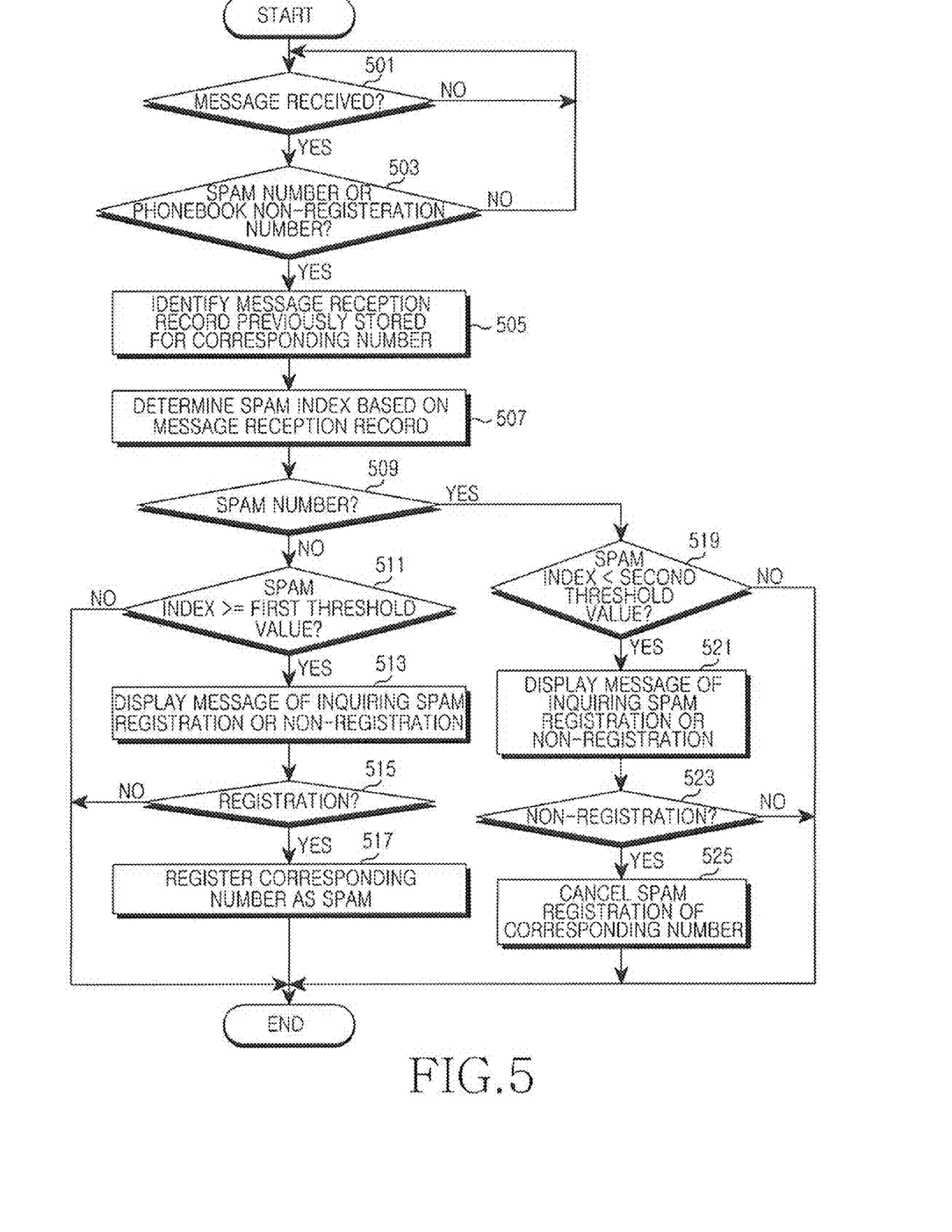
FIG. 5 is a flow diagram illustrating a procedure of registering and unregistering a spam number considering a spam index in a mobile communication terminal according to an embodiment of the present invention.

FIG. 5 illustrates a procedure of registering and unregistering a spam number considering a spam index in a mobile communication terminal according to an embodiment of the present invention.

Referring to FIG. 5, in step 501, the terminal determines whether a message is received. When a message is received, the terminal proceeds to step 503 and determines whether an outgoing phone number of the message is registered as a spam number or not registered in a phonebook. If the outgoing phone number of the message is not registered as a spam number, but is registered in the phonebook, the terminal returns to step 501 and again performs the subsequent steps.

However, if the outgoing phone number of the message is registered as a spam number or is not registered in the phonebook, the terminal proceeds to step 505 and identifies a previously stored message reception record for the outgoing phone number. Then, the terminal proceeds to step 507 and determines a spam index based on the message reception record. In step 507, the terminal newly records that the message is received for the outgoing phone number, and determines the spam index with reference to all of the new record and the identified message reception record. Also, if the outgoing phone number of the message is registered as a spam number, the terminal allows a user not avoid a notification that the message is received through the spam number by not displaying the message.

Then, if the outgoing phone number is not registered as a spam number in step 509, the terminal proceeds to step 511 and compares the determined spam index with a first threshold value. If the determined spam index is less than the first threshold value, the terminal terminates the procedure illustrated in FIG. 5. However, if the determined spam index is greater than or is equal to the first threshold value, the terminal proceeds to step 513 and displays a message of inquiring a user whether to register the outgoing phone number as a spam number. Then, in step 515, the terminal determines whether the user selects that the outgoing phone number is to be registered as a spam number. If non-registration is selected, the terminal terminates illustrated in FIG. 5. If registration is selected, the terminal proceeds to step 517 and registers the outgoing phone number as a spam number and then terminates the procedure illustrated in FIG. 5.

However, if it is determined that the outgoing phone number is registered as a spam number in step 509, the terminal proceeds to step 519 and compares the determined spam index with a second threshold value. If the determined spam index is greater than or is equal to the second threshold value, the terminal terminates illustrated in FIG. 5. However, if the determined spam index is less than the second threshold value, the terminal proceeds to step 521 and displays a message of inquiring a user whether to unregister the outgoing phone number from a spam number. Then, in step 523, the terminal determines whether the user selects that the outgoing phone number is to be unregistered from a spam number list. If non-registration is not selected, the terminal terminates the procedure illustrated in FIG. 5. If the non-registration is selected, in step 525, the terminal unregisters the outgoing phone number from a spam number and then terminates the procedure illustrated in FIG. 5.

Figure 6A:
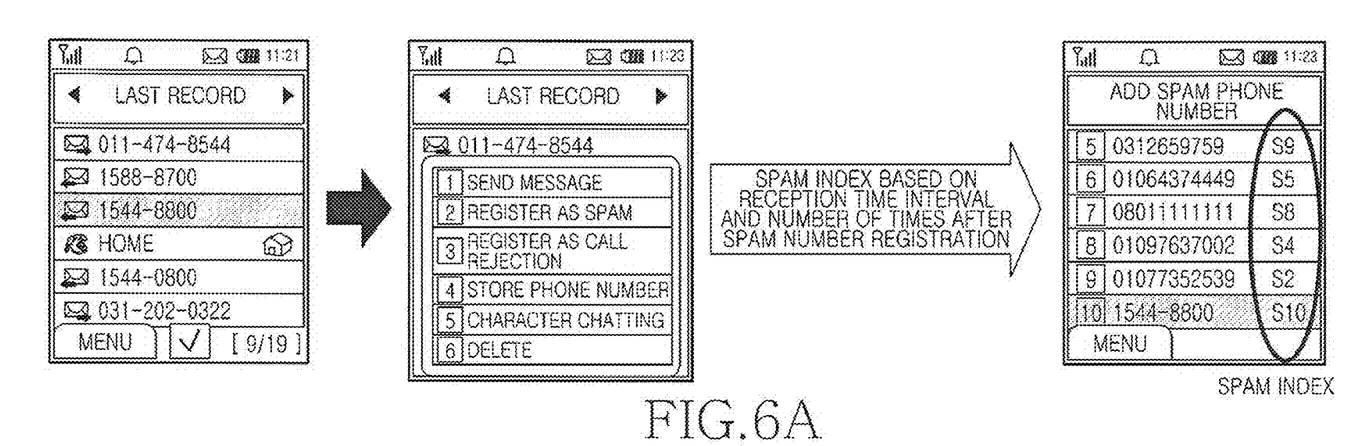
FIGS. 6A and 6B are diagrams illustrating a screen configuration of registering and unregistering a spam number in a mobile communication terminal according to an embodiment of the present invention.
Figure 6B:
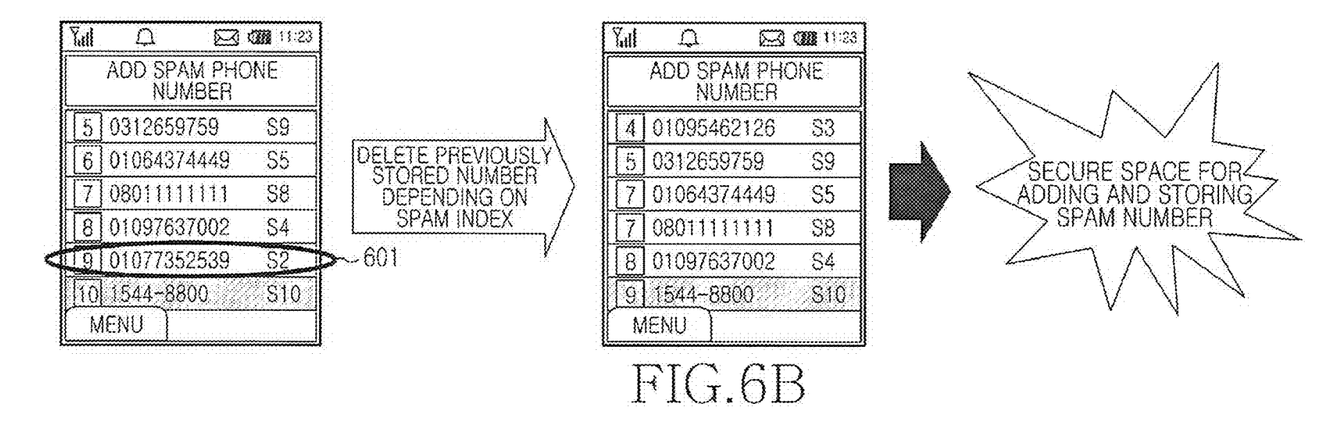

FIGS. 6A and 6B illustrates screen configurations for registering and unregistering a spam number in a mobile communication terminal according to an embodiment of the present invention.

Referring to FIGS. 6A and 6B, according to an embodiment of the present invention, the terminal determines a spam index by phone number and displays the spam index together with a phone number registered as a spam number as illustrated in FIG. 6A, thereby allowing a user to determine a spam strength of a corresponding phone number. If a registered spam number count is equal to the maximum registration count and a spam number can be no longer added as illustrated in FIG. 6B, the terminal can delete a spam number of the lowest spam index among registered spam numbers, thus securing an additional space.

According to an embodiment of the present invention, by determining a spam index by phone number, a mobile communication terminal may cancel spam number registration for a phone number of a low spam index and efficiently make use of a limited memory space for spam number registration in the mobile communication terminal. Further, by automatically registering a phone number of a high spam index as a spam number, to the mobile communication terminal may remove an inconvenience of requiring a user to register spam numbers one at a time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing a spam number in a mobile communication terminal, the method comprising:
   determining a spam index for each of at least one phone number using a reception record according to each phone number; and
   determining spam number registration or non-registration of each phone number according to the spam index, by comparing a spam index of each phone number with a preset non-registration threshold value, and upon determining that a spam index is less than the preset non-registration threshold value, cancelling spam number registration for a phone number corresponding to the spam index less than the preset non-registration threshold value.

2. The method of claim 1, wherein the reception record comprises a call received from a corresponding phone number during a predetermined period, and indicates a number of times a message is received from the corresponding phone number in the predetermined period.

3. The method of claim 1, wherein the reception record comprises at least one of a reception date, a reception time, and the number of times of reception according to date.

4. The method of claim 1, wherein the spam index is determined assigning a weight determined according to a time or date at which a message or a call is received from a corresponding phone number.

5. The method of claim 1, wherein determining the spam number registration or non-registration comprises:
   comparing the spam indexes of each phone number previously registered as a spam number; and
   cancelling spam number registration for a phone number having the lowest spam index according to a result of the comparison.

6. An apparatus for managing a spam number in a mobile communication terminal, the apparatus comprising:
   a controller for determining a spam index for each of at least one phone number using a reception record according to each phone number, and determining spam number registration or non-registration for each phone number depending on the spam index; and
   a storage unit for storing a registration of a corresponding phone number as a spam number or deleting the registration of the corresponding phone number as a spam number according to a determination of the controller,
   wherein the controller compares a spam index of each phone number with a preset non-registration threshold value and, upon determining that a spam index is less than the preset non-registration threshold value, the controller cancels spam number registration for a phone number corresponding to the spam index less than the preset non-registration threshold value.

7. The apparatus of claim 6, wherein the reception record comprises a call received from the corresponding phone number during a predetermined period, and indicates a number of times a message is received from the corresponding phone number in the predetermined period.

8. The apparatus of claim 6, wherein the reception record comprises at least one of a reception date, a reception time, and the number of times of reception according to date.

9. The apparatus of claim 6, wherein the controller determines the spam index assigning a weight determined according to a time or date at which the message or a call is received from the corresponding phone number.

10. The apparatus of claim 8, wherein the controller compares the spam index of each phone number previously registered as a spam number, and cancels spam number registration for a phone number having the lowest spam index according to a result of the comparison.

11. A method for managing a spam number in a mobile communication terminal, the method comprising:
   determining a spam index for each of at least one phone number using a reception record according to each phone number; and
   determining spam number registration or non-registration of each phone number according to the spam index, by comparing a spam index of each phone number with a preset registration threshold value, and upon determining that a spam index is greater than or is equal to the preset registration threshold value, registering a phone number corresponding to the spam index greater than or equal to the preset registration threshold value as a spam number.

12. The method of claim 11, wherein the reception record comprises a call Received from a corresponding phone number during a predetermined period, and indicates a Number of times a message is received from the corresponding phone number in the Predetermined period.

13. The method of claim 11, wherein the reception record comprises at least one of a reception date, a reception time, and the number of times of reception according to date.

14. The method of claim 11, wherein the spam index is determined assigning a weight determined according to a time or date at which a message or a call is received from a corresponding phone number.

15. The method of claim 11, wherein determining the spam number registration or non-registration comprises:
   comparing the spam indexes of each phone number previously registered as a spam number; and
   cancelling spam number registration for a phone number having the lowest spam index according to a result of the comparison.

16. An apparatus for managing a spam number in a mobile communication terminal, the apparatus comprising:
   a controller for determining a spam index for each of at least one phone number using a reception record according to each phone number, and determining spam number registration or non-registration for each phone number depending on the spam index; and
   a storage unit for storing a registration of a corresponding phone number as a spam number or deleting the registration of the corresponding phone number as a spam number according to a determination of the controller,
   wherein the controller compares a spam index of each phone number with a preset registration threshold value and, upon determining that a spam index is greater than or is equal to the preset registration threshold value, the controller registers a phone number corresponding to the spam index greater than or equal to the preset registration threshold value as a spam number.

17. The apparatus of claim 16, wherein the reception record comprises a call received from the corresponding phone number during a predetermined period, and indicates a number of times a message is received from the corresponding phone number in the predetermined period.

18. The apparatus of claim 16, wherein the reception record comprises at least one of a reception date, a reception time, and the number of times of reception according to date.

19. The apparatus of claim 16, wherein the controller determines the spam index assigning a weight determined according to a time or date at which the message or a call is received from the corresponding phone number.

20. The apparatus of claim 16, wherein the controller compares the spam index of each phone number previously registered as a spam number, and cancels spam number registration for a phone number having the lowest spam index according to a result of the comparison.

* * * * *